United States Patent
Buer

[11] Patent Number: 5,898,711
[45] Date of Patent: Apr. 27, 1999

[54] SINGLE EVENT UPSET DETECTION AND PROTECTION IN AN INTEGRATED CIRCUIT

[75] Inventor: Mark Leonard Buer, Chandler, Ariz.

[73] Assignee: VLSI Technology, Inc., San Jose, Calif.

[21] Appl. No.: 08/858,147

[22] Filed: May 15, 1997

[51] Int. Cl.[6] .................................................. G06F 11/00

[52] U.S. Cl. ..................... 371/49.1; 371/22.1; 361/729; 340/679

[58] Field of Search .................... 371/47.1, 48, 49.1, 371/49.4, 57.1, 5.1, 5.4, 3; 364/265, 266.3, 943.9, 945.6; 395/185.01, 185.05, 183.16; 380/4, 5, 52; 174/52.2, 52.4, 52.5, 68.7; 257/782, 783, 787, 687; 361/600, 728, 729, 730; 340/514, 679, 681

[56] References Cited

U.S. PATENT DOCUMENTS

| | | | |
|---|---|---|---|
| 4,365,332 | 12/1982 | Rice | 371/30 |
| 4,414,669 | 11/1983 | Heckelman et al. | 371/49.1 |
| 4,585,932 | 4/1986 | Roberts et al. | 250/380 |
| 4,959,772 | 9/1990 | Smith et al. | 395/185.01 |
| 5,389,738 | 2/1995 | Piosenka et al. | 174/52.4 |
| 5,596,716 | 1/1997 | Byers | 395/185.01 |

Primary Examiner—Trinh L. Tu
Attorney, Agent, or Firm—Douglas L. Weller

[57] ABSTRACT

Secure operations within an integrated circuit are protected. In order to perform the protection a plurality of single event upset detectors are distributed within the integrated circuit. The single event upset detectors include bit-registers. Each of the plurality of the single event upset detectors is monitored for a single event upset. When a single event upset in any of the single event upset detectors is detected, an error condition is indicated.

20 Claims, 4 Drawing Sheets

SINGLE EVENT UPSET DETECTION AND PROTECTION IN AN INTEGRATED CIRCUIT

BACKGROUND

The present invention concerns security protection within an integrated circuit design and pertains particularly to detection of a single event upset detection and protection in an integrated circuit.

For some processing applications, it is essential to operate in a secure environment so that operations cannot be probed or altered. In the prior art, various methods have been used to provide for a secure processing environment.

For example, a mechanical chassis can be used to house processing equipment. This mechanical chassis can include tamper switches and other elements to detect and protect against tampering and alterations. Unfortunately, such a mechanical chassis can add a significant amount of expense to a product.

Alternatively, in order to restrict access to particular integrated circuits, the integrated circuits can be covered with epoxy or other chemical materials to hinder access. Unfortunately, often this can be easily defeated and so provides only a nominal amount of protection.

Another method to provide for a secure processing environment is to implement the system on a single integrated circuit. A portion of the integrated circuit, for example, can be used to perform secure operations. However, there may still be attempts to defeat this arrangement.

For example, an attacker may attempt to expose information about a security key or information about a security system by applying radiation or alpha particles in the proper location. The excess radiation or alpha particles can result in a single event upset (SEU). The single event upset can affect the data integrity of a secure operation. If the single event upset occurs in an operation related to a security key or data encrypted with the security key, this may weaken the effectiveness of the protection within the integrated circuit and perhaps provide an avenue to break the security system.

In order to protect against such an attack by radiation and alpha particles, analog circuitry could be added to an integrated circuit which measures the actual radiation levels and high frequencies. However, this is very expensive and not an efficient solution for a low cost digital system.

SUMMARY OF THE INVENTION

In accordance with the preferred embodiment of the present invention, secure operations within an integrated circuit are protected. In order to accomplish the protection, a plurality of single event upset detectors are distributed within the integrated circuit. The single event upset detectors include bit-registers. Each of the plurality of the single event upset detectors is monitored for a single event upset. When a single event upset in any of the single event upset detectors is detected, an error condition is indicated.

For example, in the preferred embodiment of the present invention each single event upset detector is a counter with predicted parity. The counter may be, for example, a binary counter or a gray code counter. Detection of a single event upset in a first single event upset detector occurs when a first counter within the first single event upset detector has a parity error. In addition, detection of a single event upset in a first single event upset detector occurs when a first counter within the first single event upset detector does not roll over in synchronization with counters in other single event upset detectors.

For example, the integrated circuit includes a secure module. At least one of the single event upset detectors is located within a secure module within the integrated circuit. Also, at least one of the single event upset detectors is located outside the secure module.

At a location within the integrated circuit, a collector module monitors each of the plurality of the single event upset detectors. When the collector module detects a single event upset in any of the single event upset detectors the collector module indicates that an error condition has occurred, and may take additional appropriate action. For example, upon the collector module detecting a single event upset in any of the single event upset detectors, the collector module resets operation of the integrated circuit.

The present invention provides for an inexpensive way to detect the possible corruption of data resulting form a single event upset. This increases security of an integrated circuit by allowing for the prompt detection and protection against attack by radiation or alpha particles.

DESCRIPTION OF THE PREFERRED EMBODIMENT

Figure 1:
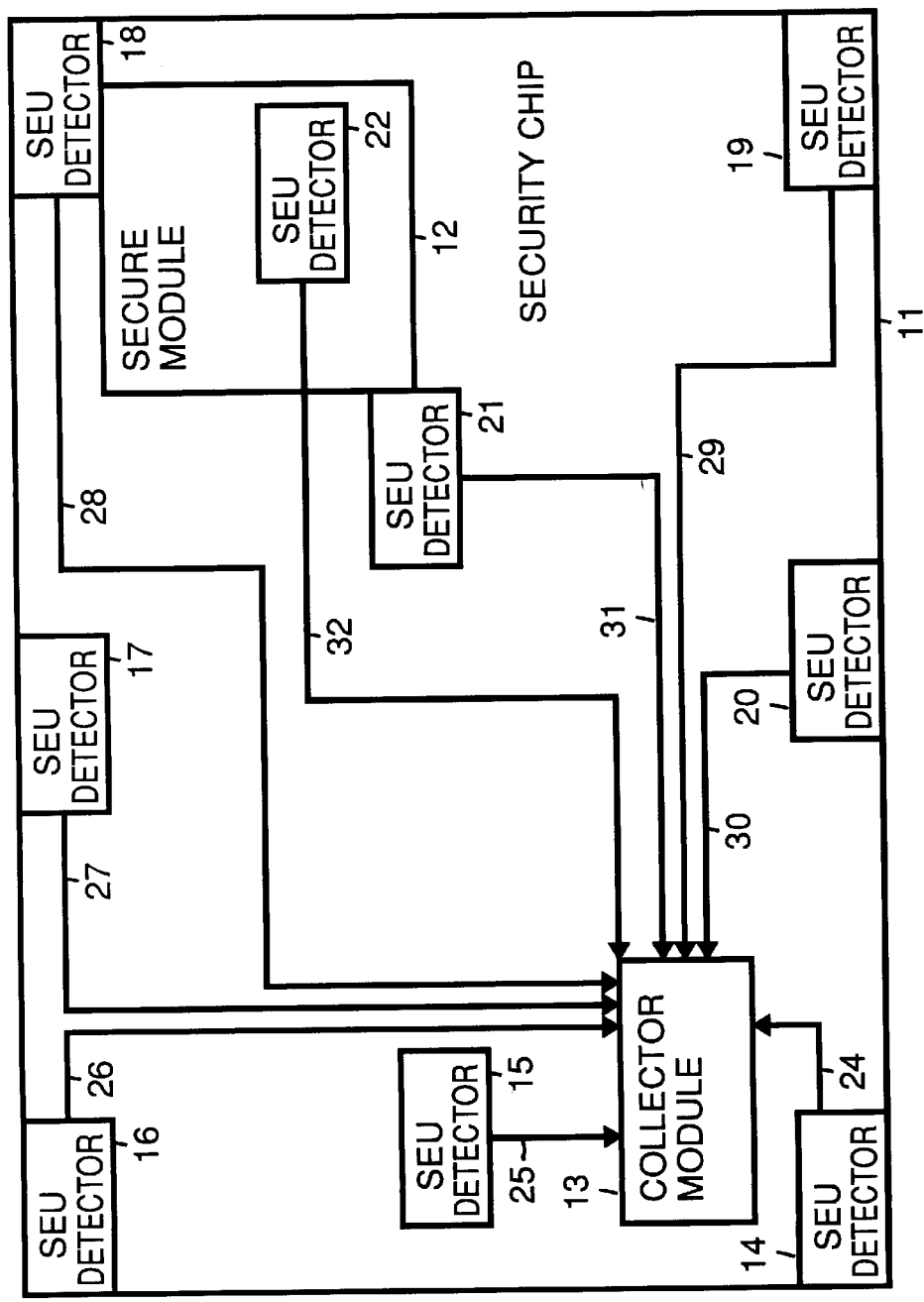
FIG. 1 is a simplified block diagram of circuitry which provides detection and protection against single event upsets within an integrated circuit in accordance with a preferred embodiment of the present invention.

FIG. 1 is a simplified block diagram of circuitry which provides detection and protection against single event upsets within a secure integrated circuit 11. Secure integrated circuit 11 includes a secure module 12 which stores logic used to perform secure operation. Secure module 12 includes various secure features to protect operations and/or information from being obtained by an unauthorized person.

Within secure module 12, a single event upset (SEU) detector 22 is placed. Depending upon the size of secure module 29, more than one single event upset detector may be placed within secure module 29.

Also, close to secure module 29 and scattered throughout secure integrated circuit 11 are additional single event upset detectors. For example, FIG. 1 shows included on secure integrated circuit 11 a single event upset detector 14, a single event upset detector 15, a single event upset detector 16, a single event upset detector 17, a single event upset detector 18, a single event upset detector 19, a single event upset detector 20 and a single event upset detector 21. The single event upset detectors are scattered throughout secure integrated circuit 11 in order to detect event which occur even in seemingly non-critical areas of secure integrated circuit 11.

In addition to secure module 12, and single event upset detector 14 through 22, there is other circuitry within secure integrated circuit 11 which performs various operations. For example, a collector module 13 collects information from each of single event upset detectors 14 through 22 in order to detect and protect secure integrated circuit 11 against a single event upset anywhere within secure integrated circuit 11.

Collector module 13 collects single event upset detection information from single event upset detector 14 via a data path 24 within secure integrated circuit 11. Collector module 13 collects single event upset detection information from single event upset detector 15 via a data path 25 within secure integrated circuit 11. Collector module 13 collects single event upset detection information from single event upset detector 16 via a data path 26 within secure integrated circuit 11. Collector module 13 collects single event upset detection information from single event upset detector 17 via a data path 27 within secure integrated circuit 11. Collector module 13 collects single event upset detection information from single event upset detector 18 via a data path 28 within secure integrated circuit 11. Collector module 13 collects single event upset detection information from single event upset detector 19 via a data path 29 within secure integrated circuit 11. Collector module 13 collects single event upset detection information from single event upset detector 20 via a data path 30 within secure integrated circuit 11. Collector module 13 collects single event upset detection information from single event upset detector 21 via a data path 31 within secure integrated circuit 11. Collector module 13 collects single event upset detection information from single event upset detector 22 via a data path 32 within secure integrated circuit 11.

Each of single event detectors 14 through 22 uses digital logic to detect single event upsets. For example bit registers, each composed of a flip-flop, within single event detectors are monitored for a state transition due to single event upset. The flip-flops are utilized in a predetermined pattern and then are monitored for errors that occur during operation. An error in the state transition can indicate, for example, a single event upset caused by radiation, alpha particles or some other operation error within secure integrated circuit 11.

Figure 2:
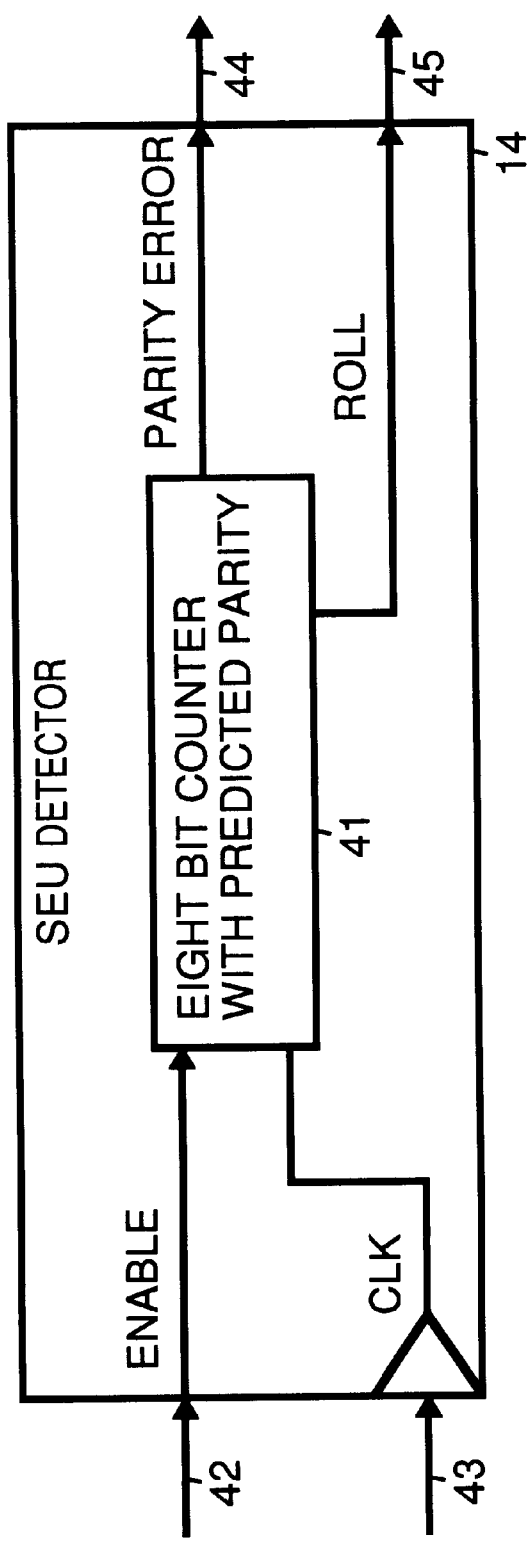
FIG. 2 is a simplified block diagram of a single event upset detector in accordance with a preferred embodiment of the present invention.

For example, FIG. 2 shows single event upset detector 14 implemented using an eight-bit counter 41 with predicted parity. While FIG. 2 shows the use of eight-bit counter 41, a counter of any size may be used. Alternatively, logic other than a counter may be used to implement single event upset detector 14. Eight-bit counter 41 includes an enable input 42, a clock input 43, a parity error output 44 and a roll over output 45. Enable input 42 serves to enable and disable eight-bit counter 41. A clock input 43 clocks eight-bit counter 41. Parity error output 44 indicates the current parity of eight-bit counter 41. Roll-over output 45 indicates when eight-bit counter 41 has completed counting up to its maximum value and has rolled over.

Figure 3:
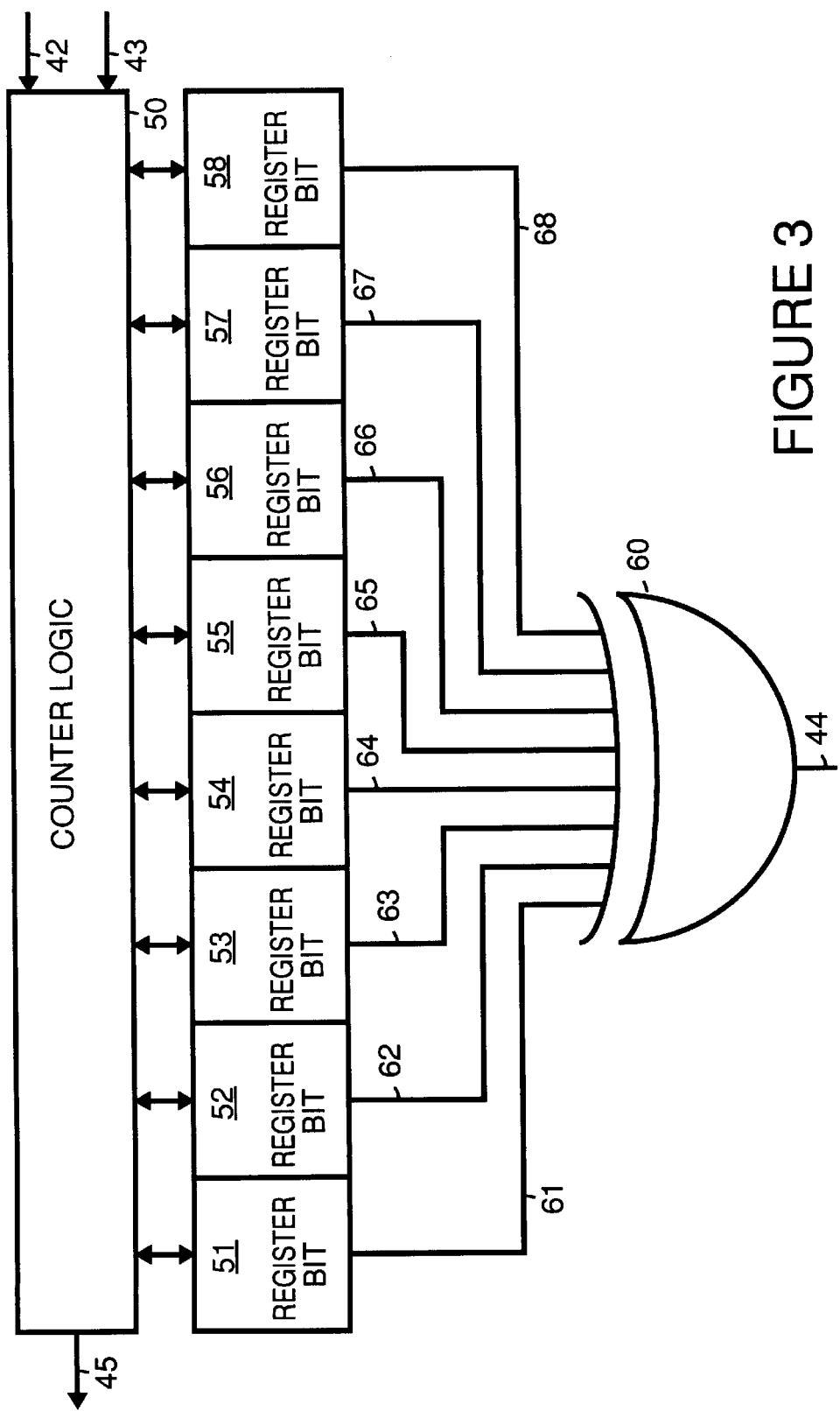
FIG. 3 is a simplified block diagram which illustrates logic within a counter within a single event upset detector in accordance with a preferred embodiment of the present invention.

FIG. 3 shows a simplified implementation of eight-bit counter 41. A register bit 51, a register bit 52, a register bit 53, a register bit 54, a register bit 55, a register bit 56, a register bit 57, and a register bit 58 each store one bit of the current count. For example, each of register bits 51 through 58 are implemented as a flip-flop. Counter logic 50 calculates a next count to be placed in register bits 51 through 58. For example, counter logic 50 implements a binary count. Alternatively, counter logic 50 implements a gray scale eight-bit count, or some other predictable counting scheme. In order to calculate parity, an XOR logic gate 60, or some equivalent functional block, performs a logic XOR upon the current values of register bit 51, register bit 52, register bit 53, register bit 54, register bit 55, register bit 56, register bit 57 and register bit 58 received respectively through a data path 61, a data path 62, a data path 63, a data path 64, a data path 65, a data path 66, a data path 67 and a data path 68.

Collector module 13 is placed in a convenient location within secure integrated circuit 11. Collector module 13 checks to make sure that the parity of the counters within all the single event upset detectors remain in synchronization. Likewise, collector module 13 checks to make sure that all the counters within all the single event upset detectors roll over in synchronization. When the parity from any single event upset detector or the roll over signal from any single event upset detector is out of synchronization, collector module 13 has detected a single event upset. A single event upset resulting in a parity error will be detected immediately. A single event upset resulting in a roll over error will be detected within the maximum count of the counter within the single event upset detector. For an eight-bit counter, for example, the maximum count is 256.

Upon collector module 13 detecting a single event upset, collector module 13 signals the single event upset has occurred, for example, by setting a flag in a register or signaling a controlling device. In addition, collector module 13 can take additional appropriate action, such as resetting secure integrated circuit 11.

Figure 4:
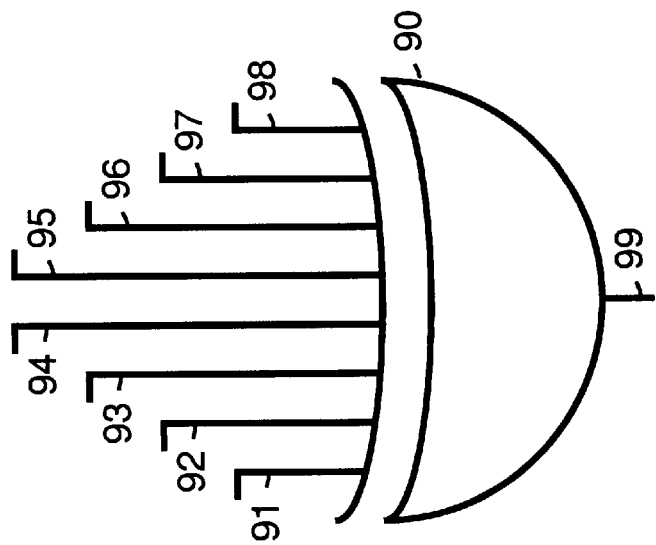
FIG. 4 is a simplified block diagram which illustrates detection logic within a collector module within a single event upset detector in accordance with a preferred embodiment of the present invention.
Figure 4:
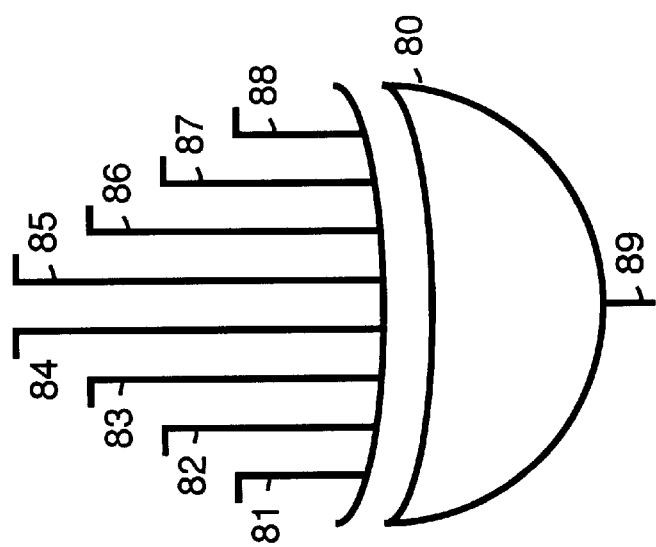

The detection portion of collector module 13 can be implemented in various ways. For example, as shown in FIG. 4, an XOR logic gate 80 or a logic block with similar functionality, can be used to perform a logic XOR function on the parity of each single event upset detector. Each of inputs 81, 82, 83, 84, 85, 86, 87 and 88 represent the parity of a single event upset detector. The number of inputs vary according to the number of single event upset detectors. Provided there is an even number of single event upset detectors, output 89 should always be equal to logic zero. When output 89 is at logic one, this indicates a parity error has occurred.

Likewise, an XOR logic gate 90 or a logic block with similar functionality, can be used to perform a logic XOR function on the roll over value of each single event upset detector. Each of inputs 91, 92, 93, 94, 95, 96, 97 and 98 represent the roll over value of a single event upset detector. The number of inputs vary according to the number of single event upset detectors. Provided there is an even number of single event upset detectors, output 99 should always be equal to logic zero. When output 99 is at logic one, this indicates a roll over value error has occurred.

For the implementation shown in FIG. 4, it is possible that more than one simultaneous errors may work to cancel each other. For this reason, if there is a possibility of simultaneous errors, more rigorous circuitry may be used within collector module 13 to detect multiple simultaneous parity and roll-over errors in the single event detectors.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for protecting secure operations within an integrated circuit comprising the following steps:

(a) distributing within the integrated circuit, a plurality of single event upset detectors, the single event upset detectors including bit-registers;

(b) monitoring each of the plurality of the single event upset detectors for a single event upset, wherein the single event upset detectors, during normal operation of the integrated circuit, are continually active to detect a single event upset caused by bombardment of the integrated circuit with radiation and to detect a single event upset caused by bombardment of the integrated circuit with alpha particles, the single event upset being detected when a state transition occurs within a first bit-register, the state transition not being caused by logic circuitry connected to the first-bit register, but the state transition being an erroneous transition; and, (c) when a single event upset in any of the single event upset detectors is detected, indicating an error condition.

2. A method as in claim 1 additionally comprising the following step:

(d) when a single event upset in any of the single event upset detectors is detected, resetting operation of the integrated circuit.

3. A method as in claim 1 wherein in step (b) the monitoring of each of the plurality of the single event upset detectors is performed by a collector module within the integrated circuit.

4. A method as in claim 1 wherein in step (a) at least one of the single event upset detectors is located within a secure module within the integrated circuit.

5. A method as in claim 1 wherein in step (a) at least one of the single event upset detectors is located outside a secure module within the integrated circuit.

6. Circuitry on an integrated circuit for protecting secure operations comprising:

a plurality of single event upset detectors distributed within the integrated circuit, the single event upset detectors including bit-registers, wherein each of the plurality of single event upset detectors, during normal operation of the integrated circuit, is continually active to detect a single event upset caused by bombardment of the integrated circuit with radiation and to detect a single event upset caused by bombardment of the integrated circuit with alpha particles; and, monitoring means, coupled each of detectors, for detect single event upset detectors, for detecting a single event upset within any of the single event upset detectors, the monitor means indicating an error condition when a single event upset in any of the single event upset detectors is detected, the monitoring means detecting the single event upset when a state transition occurs within a first bit-register, the state transition not being caused by logic circuitry connected to the first-bit register, but the state transition being an erroneous transition.

7. A circuitry as in claim 6 wherein the monitoring means, upon detecting a single event upset in any of the single event upset detectors, resets operation of the integrated circuit.

8. A circuitry as in claim 6 wherein in the monitoring means comprises a collector module located within the integrated circuit.

9. A circuitry as in claim 6 wherein the integrated circuit includes a secure module and at least one of the single event upset detectors is located within the secure module.

10. A circuitry as in claim 6 wherein the integrated circuit includes a secure module and at least one of the single event upset detectors is located outside the secure module.

11. A method for protecting secure operations within an integrated circuit comprising the following steps:

(a) distributing within the integrated circuit, a plurality of single event upset detectors, the single event upset detectors including bit-registers, wherein each single event upset detector is a counter with predicted parity;

(b) monitoring each of the plurality of the single event upset detectors for a single event upset; and, (c) when a single event upset in any of the single event upset detectors is detected, indicating an error condition, wherein detection of a single event upset in a first single event upset detector occurs when a first counter within the first single event upset detector does not roll over in synchronization with counters in other single event upset detectors.

12. Circuitry on an integrated circuit for protecting secure operations comprising:

a plurality of single event upset detectors distributing within the integrated circuit, the single event upset detectors including bit-registers, wherein each single event upset detector comprises a counter with predicted parity; and, monitoring means, coupled each of the plurality of the single event upset detectors, for detecting a single event upset within any of the single event upset detectors, the monitor means indicating an error condition when a single event upset in any of the single event upset detectors is detected;

wherein a first single event upset detector detects a single event upset when a first counter within the first single event upset detector does not roll over in synchronization with counters in other single event upset detectors.

13. A method for protecting secure operations within an integrated circuit comprising the following steps:

(a) distributing within the integrated circuit, a plurality of single event upset detectors, the single event upset detectors including bit-registers, wherein each single event upset detector is a counter with predicted parity;

(b) monitoring each of the plurality of the single event upset detectors for a single event upset, wherein the single event upset detectors, during normal operation of the integrated circuit, are continually active to detect a single event upset caused by bombardment of the integrated circuit with radiation and to detect a single event upset caused by bombardment of the integrated circuit with alpha particles; and, (c) when a single event upset in any of the single event upset detectors is detected, indicating an error condition.

14. A method as in claim 13 wherein in step (c) detection of a single event upset in a first single event upset detector occurs when a first counter within the first single event upset detector has a parity error.

15. A method as in claim 13 wherein in step (c) each counter is a binary counter.

16. A method as in claim 13 wherein in step (c) each counter is a gray code counter.

17. Circuitry on an integrated circuit for protecting secure operations comprising:

a plurality of single event upset detectors distributed within the integrated circuit, the single event upset detectors including bit-registers, wherein each of the plurality of single event upset detectors, during normal operation of the integrated circuit, is continually active to detect a single event upset caused by bombardment of the integrated circuit with radiation and to detect a single event upset caused by bombardment of the integrated circuit with alpha particles, wherein each single event upset detector comprises a counter with predicted parity; and, monitoring means, coupled each of the plurality of the single event upset detectors, for detecting a single event upset within any of the single event upset detectors, the monitor means indicating an error condition when a single event upset in any of the single event upset detectors is detected.

18. A circuitry as in claim 17 wherein a first single event upset detector detects a single event upset when a first counter within the first single event upset detector has a parity error.

19. A circuitry as in claim 17 wherein each counter is a binary counter.

20. A circuitry as in claim 17 wherein each counter is a gray code counter.

* * * * *